US008352188B2

(12) United States Patent
Scott et al.

(10) Patent No.: US 8,352,188 B2
(45) Date of Patent: Jan. 8, 2013

(54) APPARATUS FOR GENERATING HIGH RESOLUTION SURFACE TOPOLOGY MAP USING SURFACE PROFILING AND SURVEYING INSTRUMENTATION

(75) Inventors: Dennis P. Scott, Mill Valley, CA (US); Dwight D. Day, Manhattan, KS (US)

(73) Assignee: Surface Systems & Instruments, Inc., Mill Valley, CA (US)

( * ) Notice: Subject to any disclaimer, the term of this patent is extended or adjusted under 35 U.S.C. 154(b) by 737 days.

(21) Appl. No.: 12/409,317

(22) Filed: Mar. 23, 2009

(65) Prior Publication Data

US 2010/0198516 A1 Aug. 5, 2010

Related U.S. Application Data

(60) Provisional application No. 61/149,227, filed on Feb. 2, 2009.

(51) Int. Cl.
*G01V 3/38* (2006.01)
*G01C 22/00* (2006.01)
(52) U.S. Cl. ............................................... 702/5; 701/26
(58) Field of Classification Search .............. 702/5, 1–2, 702/14, 16, 33, 81, 84, 127, 141–142, 149–160, 702/179, 182–183, 188–189; 703/5, 7; 701/2, 701/23, 25–26
See application file for complete search history.

(56) References Cited

U.S. PATENT DOCUMENTS

| | | | |
|---|---|---|---|
| 2003/0135328 A1 | 7/2003 | Burns et al. ........................ | 702/5 |
| 2005/0010379 A1 | 1/2005 | Meiners et al. .................... | 703/1 |

OTHER PUBLICATIONS

Rohmer et al., Action Planner of Hybrid Leg-Wheel Robots for Lunar and Planetary Exploration, Sep. 22-26, 2008, 2008 IEEE/RSJ International Conference on Intelligent Robots and Systems, Nice , France, pp. 3902-3907.*
Ishigami et al., Path Planning for Planetary Exploration Rovers and Its Evaluation based on Wheel Slip Dynamics, Apr. 10-14, 2007, 2007 IEEE International Conference on Robotics and Automation, Roma, Italy, pp. 2361-2366.*
Westphalen et al., Topographic Mapping Through Measurement of Vehicle Attitude and Elevation, 2004, Transactions of the ASAE, pp. 1841-1849.*
Farah et al., Accuracy Assessment of Digital Elevation Models Using GPS, 2008, Artificial Satellites, vol. 43, No. 4, pp. 151-161.*
"*APGS Dirt-Pro*," Brochure, agpsinc.com, Nov. 19, 2008, 2 pages.
"*Auto Rod & Level*," Brochure APR Consultants, Inc., 2000, 1 page.

(Continued)

*Primary Examiner* — Toan Le
(74) *Attorney, Agent, or Firm* — Beyer Law Group LLP

(57) ABSTRACT

A profiling apparatus configured to generate a high-resolution surface topology map of a surface using surface profiling data combined with surveying data. The apparatus is configured to collect both a plurality of survey sample points and a plurality of profile sample points of the surface. The profile sample points are then correlated with the survey sample points in the Z direction. Once the correlation is performed, the correlated profile sample points are merged or "filled-in" between the survey sample points. The high-resolution surface topology map is generated from the merging of the survey and profile sample points. In various embodiments, the survey data may be generated using an inertial profiler, an inclinometer based walking device, or a rolling-reference type profile device.

35 Claims, 10 Drawing Sheets

OTHER PUBLICATIONS

Bartoszek, John, "*Smooth Pavements a Contractor's Perspective*," 2008 Annual Road Profiler User's Group Meeting, PowerPoint Presentation.

"*Gomaco Smoothness Indicator*," Brochure, gomaco.com, 2008, 8 pages.

"*GPS Basics*," Booklet, Lecia Geosystems, 1999, 64 pages.

"*GPS Subsystem*," Brochure, International Cybernetics Corporation, Sep. 1, 2006, 3 pages.

"*GradeMaster, RoadMaster 3D Machine Control*," Brochure, GradeMaster GPS Systems, Sep. 2006, 4 pages.

"*Intertial+ Novatel OEM-V and OEM-4 Integration*," Brochure, Oxford Technical Solutions, 2008, 14 pages.

"*IS Imaging Station*," Brochure, Topcon Corporation, 2008, 4 pages.

"*Laser Zone: Rotating Elevation Measurement Laser System*," Brochure, Topcon Corporation, 2004, P/N 7010-0669 Rev. A, 2 pages.

"*Laser-Based Grade Display Systems*," Brochure, 2005 Trimble Navigation Limited, 2 pages.

"*Leica TPS1200+ Series High performance Total Station*," Brochure, Leica Geosystems, 2007, 12 pages.

"*Leica TPS1200+ Series Technical Data*," Brochure, Leica Geosystems, 2006, 16 pages.

"*Model 6200 Lightweight Inertial Surface Analyzer—LISA*," Ames Engineering, URL: http://www.amesengineering.com/ameslisa.htm, 1998-2008, downloaded on Dec. 21, 2009, 3 pages.

"*Model 8200 HSPHigh Speed Profiler Kit*," Ames Engineering, URL: http://www.amesengineering.com/ameshsp.htm, 1998-2009, downloaded on Dec. 21, 2009, 3 pages.

"*POSLV Specifications*," Applanix.com, 2009, 2 pages.

"*PPS-2005 Pavement Profile Scanner*," Phoenix Scientific, Inc., 2004, 2 pages.

"*Precision Grade Laser Transmitter with Long-range Remote Control*," Brochure, Trimble Navigation Limited, 2006, 8 pages.

"*Road Profilers*," Brochure, International Cybernetics Corporation, Sep. 1, 2006, 4 pages.

"*Topcon 3-D Millimeter GPS*," Topcon Corporation, URL: http://www.topconpositioning.com/products/gps/millimeter-gps-/3d-millimeter-gps.html, 2009, 4 pages.

"*Trimble ATS: Advanced Tracking Sensor (ATS) with target recognition capability for stakeless machine control and survey applications*," Trimble Navigation Limited, 2002, 4 pages.

"*Trimble S8 Total Station*," Datasheet, Trimble.com, URL: http://trl.trimble.com/docushare/dsweb/Get/Document-390412/022543-410B_TrimbleS8_DS_0908_1r.pdf, downloaded on Jan. 8, 2010, 2007-2008 Trimble Navigation Limited, 2 pages.

"*Trimble Site Positioning Systems*," Brochure, 2005-2007 Trimble Navigation Limited, 12 pages.

International Search Report in corresponding PCT application PCT/US2010/022761, mailed Mar. 31, 2010.

Written Opinion in corresponding PCT application PCT/US2010/022761, mailed Mar. 31, 2010.

"*Inertial+ Cost Effective improvement to GPS measurements*," Brochure, Oxford Technical Solutions, Jan. 3, 2008, 2 pages.

"*Inertial+ Inertial and GPS Measurement System*," User Manual, Oxford Technical Solutions, Feb. 13, 2008, 14 pages.

"*Survey Profiler Design Grade Control*," Brochure, pavesmart.com, 2 pages, published before Feb. 1, 2009.

"*RoadEng, Civil Engineer*," Brochure, Softree.com, 4 pages, published before Feb. 1, 2009.

Gerardi, Tony, "*Tracking Pavement Settlement in Airport Pavements*," APR Consultants, Inc., url: https://transportation.wes.army.mil/tsworkshop/presentations/32/Paper.pdf, 11 pages, published before Feb. 1, 2009.

"*Portable Road Surface ProfilerMark IV*," Brochure, Dynatest.com, 1 page, published before Feb. 1, 2009.

"*Dynatest 6450 Lightweight Profilometer®*," Brochure, Dynatest.com, 1 page, published before Feb. 1, 2009.

"*Road Surface Profiler 5051 Mark III*," Brochure, Dynatest.com, 1 page, published before Feb. 1, 2009.

"*The Dynatest Model 5051 Mark III Road Surface Profiler Test System Specifications*," 7 pages, published before Feb. 1, 2009.

"*Survey Profiler Design Grade Control*," Brochure, pavesmart.com, 1 page, published before Feb. 1, 2009.

"*Terramodel Software for Construction*," Brochure, 2002 Trimble Navigation Limited, 6 pages.

"*Topcon Millimeter GPS*," Brochure, 2004, Topcon Corporation, 3 pages.

\* cited by examiner

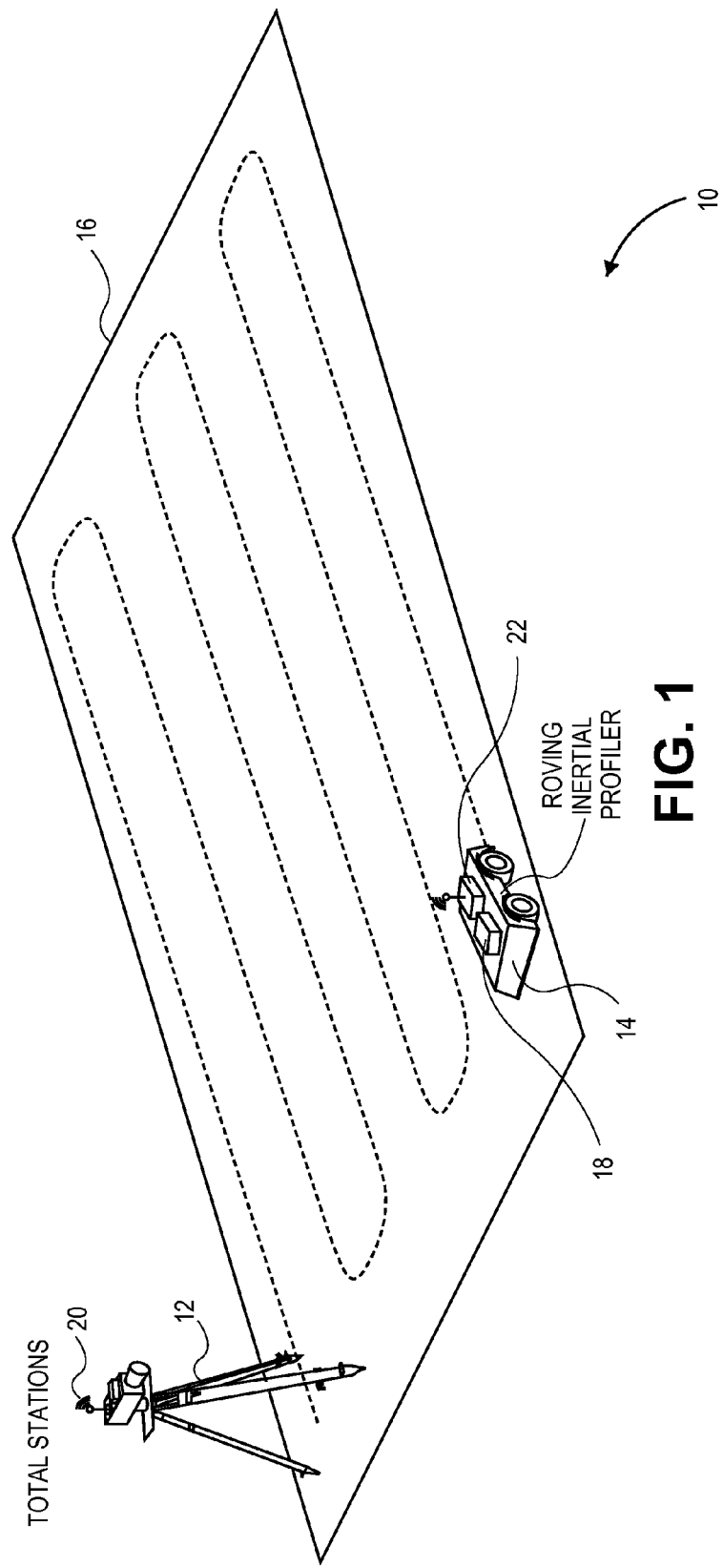

400FT. X 400FT. SURFACE

963 SHOTS TAKEN IN 30 MINUTES USING COMBINED INERTIAL PROFILE AND SURVEY DATA

APPARATUS FOR GENERATING HIGH RESOLUTION SURFACE TOPOLOGY MAP USING SURFACE PROFILING AND SURVEYING INSTRUMENTATION

CROSS REFERENCE TO RELATED APPLICATIONS

The present application claims priority to U.S. Provisional Patent Application Ser. No. 61/149,227. entitled "Method and Apparatus for Generating High Resolution Surface Topology Maps Using Inertial Profiling and Surveying Instrumentation," filed Feb. 2, 2009. and incorporated by reference herein for all purposes.

BACKGROUND

1. Field of the Invention

This invention pertains to an apparatus for generating high resolution surface topology maps, and more particularly, to an apparatus for generating high resolution surface topology maps using surface profiling data combined with data collected from a land surveying instrument, such as either a total station or a Global Positioning System with Real Time Kinematic (RTK) surveying device, such as a Carrier-Phase Enhancement GPS System (CPGPS) using a single reference station or a Virtual Reference Station (VRS) using a group of networked reference stations.

2. Description of Related Art

Land surveying instruments are used to generate three-dimensional topography maps of surfaces at grade for use in civil engineering and construction projects. Currently two types of surveying instrument systems are in common use, total stations and radio transmitted Real Time Kinematic ("RTK") correction devices. In various configurations, both types of surveying instruments may be used with GPS data.

A total station is an optical instrument used in modern surveying. A total station system includes a base station equipped with a computer, a laser, and an optical receiver. The total station is designed to work in cooperation with a prism, which is moved to various points on the surface to be mapped. During operation, the prism is moved from point to point within the area to be surveyed. At each point, the laser transmits a signal from the base station to the prism, which reflects the signal back to the optical receiver at the base station. The computer at the base station then calculates the X, Y and Z coordinate of the location of the prism. The X and Y coordinates are calculated by the round-trip travel time of the laser. The Z coordinate is determined by the angle of the return laser signal. By calculating the X, Y and Z coordinate of many surface sample points, an accurate topological map of the area to be surveyed may be generated. One disadvantage of conventional total stations is that they require a line of site between the base station and the prism at the point to be surveyed. Without a line of sight, the aforementioned angle and distances cannot be determined. Any resulting surface topology map will therefore be incomplete. To address this issue, more advanced total station devices use GPS information instead of line of sight measurements. The disadvantage of GPS information, however, is generally inferior accuracy in the vertical or Z direction.

Real Time Kinematic ("RTK") surveying devices rely on Global Positioning System ("GPS") technology to improve the accuracy of sampled survey data points. With RTK systems, a static base GPS unit is used in cooperation with a roving GPS unit. The static base GPS unit accurately measure its position relative to one or more GPS satellites or a Virtual Reference System (VRS), which is a group of networked base stations located in the general vicinity of the area to be surveyed. In either case, the static base unit measures atmospheric and other disturbances that may cause positional errors. Once the static base station locks-in and accurately determines its position, it transmits a corrections factor signal to the roving GPS unit, which compensates for any measured atmospheric or positional errors.

During the surveying process, the roving GPS unit moves across the surface to be mapped, sampling and measuring the X, Y and Z coordinate of multiple points within the survey area. The correction factor signal from the static base GPS unit is then applied to the measured X, Y and Z coordinate of each sample point, correcting for any inaccuracies due to atmospheric and other disturbances. The compensated X, Y and Z coordinate for the sampled points are therefore more accurate than if the correction factor was not applied. Again, by computing the X, Y and Z coordinate for multiple sample points across the area to be surveyed, an accurate surface topology map may be generated. A disadvantage of both GPS and VRS systems is their inability to function in areas of overhead cover (wooded areas, urban areas, inside buildings, etc.), where clear access to the GPS satellite is either partially or fully blocked.

In the road construction industry, inertial profiling systems are increasingly popular devices used for quality assurance and quality control purposes. The most common use of inertial profilers is to test the surface ride quality or "smoothness" of the top layer of asphalt or concrete pavement on road surfacing construction projects. Transportation agencies also commonly use inertial profiling systems for pavement management and maintenance applications. Roads are periodically analyzed for condition assessment and for making decisions with regard to rehabilitating or resurfacing of the roadway.

The profile of a surface generated by an inertial profiling system is a relative profile, not an absolute or true profile. Inertial profilers generate only a two-dimensional surface profile along a longitudinal surface in the X and Y dimensions, along the path traveled by the profiler. Inertial profiling systems, however, do not generate a true profile since they do not record absolute elevation readings in the Z dimension, as do RTK or total stations surveying instruments. Thus while an inertial profiling system can accurately detect the changes in the surface profile contour between points A and B on a given road surface, they cannot detect the absolute change in elevation from point A to point B.

Inertial profiling systems are typically vehicle mounted devices generally consisting of laser sensors for measuring vertical displacement from a fixed point on the vehicle to the ground underneath, accelerometer sensors to measure the vertical acceleration of the vehicle, and a distance measurement interface to record the vehicle's longitudinal movement in the direction of travel. Commercially available inertial profiling systems typically have a very high degree of resolution. Many commercially available profilers are capable of acquiring valid samples at one-inch (25 mm) increments along the traveled surface and can detect changes in surface profile conditions on the order of 0.001 inches. Inertial profiling systems can collect data samples at one inch (25 mm) at speeds up to 70 mile per hour (112 kilometers per hour). In contrast, both total stations and RTK surveying devices have a lower resolution than inertial profiling systems if only relative profile data is considered, but those devices have a much higher resolution in capturing the Z dimension necessary to generate an absolute or true profile. While the resolution of both total stations and RTK surveying devices is sufficient for some applications, the resolution of these devices alone is not adequate or optimal for other applications, such as high tolerance surface design, construction project progress monitoring, or precision machine control, where a highly accurate and more resolute surface topology is desirable.

For the above reasons, an apparatus for generating high-resolution surface topology measurements using surface profiling data combined with data collected from a surveying instrument, such as either a total station or a Real Time Kinematic (RTK) surveying device, including either a total station RTK surveying device used with either GPS or VRS, is needed.

SUMMARY OF THE INVENTION

The present invention is directed to an apparatus for generating a high-resolution surface topology map of a surface using surface profiling data combined with data collected from a surveying instrument. The apparatus includes an profiling device that is configured to receive a plurality of survey sample points and collecting a plurality of profile sample points of the surface. Computer hardware associated with the profiling device correlates the profile sample points with respect to the survey sample points in the Z direction. Once the correlation is performed, the correlated sample points are merged or "filled-in" by the computing hardware between the survey sample points. The high-resolution surface topology map is generated from the merging of the survey and profile sample points. In various embodiments, the survey data may be generated using an inertial profiler, an inclinometer based walking device, or a rolling-reference type profile device.

BRIEF DESCRIPTION OF THE DRAWINGS

The invention may best be understood by reference to the following description taken in conjunction with the accompanying drawings, which illustrate specific embodiments of the invention.

FIG. 1 is a diagram of a high-resolution surface topology measurement system using an inertial profiler and a total stations surveying instrument according to one embodiment of the present invention.

It should be noted that like reference numbers refer to like elements in the figures.

DETAILED DESCRIPTION OF SPECIFIC EMBODIMENTS

Figure 2A:
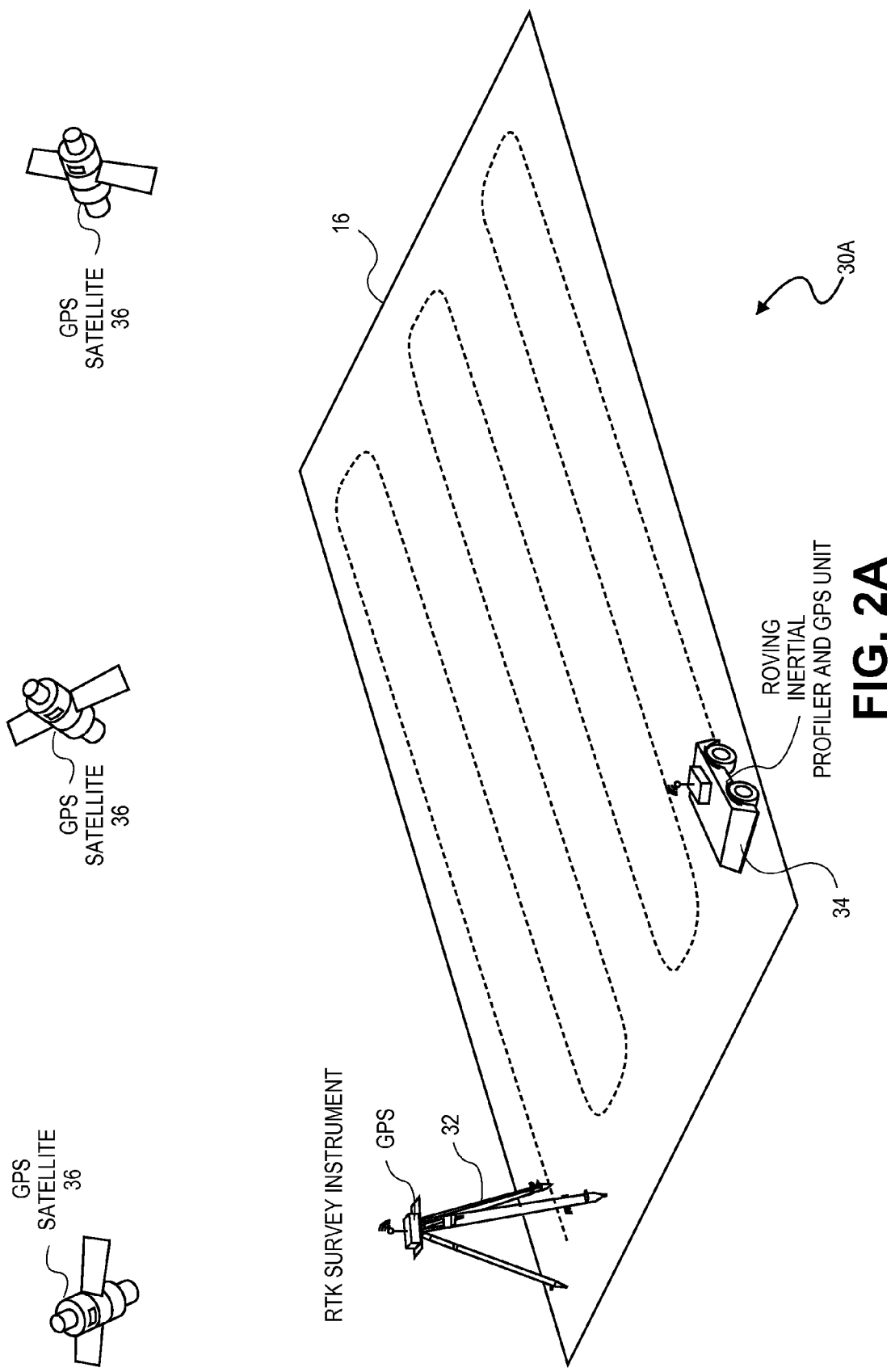
FIG. 2A is a diagram of a high-resolution surface topology measurement system using an inertial profiler and a RTK surveying instrument used in cooperation with GPS according to another embodiment of the present invention.

The present invention is directed to a high-resolution surface topology measurement apparatus and method that uses data collected from both an inertial profiling system and a surveying instrument, such as either a total stations system or an RTK system that uses either GPS or VRS. With data from the inertial profiling system sampling at a much finer interval than either surveying instrument, the "gaps" between the survey instrument sample points can be "filled-in" with the finer or higher resolution inertial profiler sample points. The inertial data points are then mathematically height-correlated with the true elevation readings from survey instrument. As a result, the gaps between the survey sample points are "filled-in" with the correlated inertial profile data points, resulting in a denser, higher resolution, more accurate three-dimensional map of the measured surface terrain compared to the same when generated by just a total station or RTK survey instrument alone.

FIG. 1 is a diagram of a high-resolution surface topology measurement system 10 including a total stations surveying instrument 12 and an inertial profiler 14 according to one embodiment of the present invention. In this example, the system 10 is being used to generate a high-resolution topology map of a surface 16. For the sake of simplicity, the surface 16 is illustrated as flat. It should be understood that in most real-world situations, the surface to be mapped is contoured, with one or more slopes, valleys, and troughs. The total stations instrument 12 is a conventional survey instrument that includes a computer, laser and optical receiver, as is well known in the art. The inertial profiler 14 includes all the standard instrumentations known in the art used for generating inertial profile data, such as a distance measuring device (DMI), an accelerometer which generates a signal commensurate with the up/down movements or vertical acceleration of the host vehicle as it travels along the surface terrain being measured, and a laser range finder that measures the vertical offset between the inertial profiler 14 relative to the surface. As both total stations 12 and inertial profilers 14 are well known, a more detailed explanation of the above listed components of these two devices is not provided herein.

The system 10 further includes a prism 18 located on the roving initial profiler 14 and radio transceivers 20 and 22 provided on the total station 12 and the profiler 14 respectively. With this arrangement, the profiler 14 may generate the inertial profile data as it roves across the surface 16. At the same time, the total stations 12 uses the prism 18 on the roving profiler 14 to measure and compute survey data points.

During operation, the roving inertial profiler traverses back and forth across the surface 16, as indicated by the dashed lines in the figure, collecting the inertial profile data points. At the same time, the survey data points are determined at the total stations instrument 12 and are transmitted in substantially real-time back to the inertial profiler 14 using transceivers 20 and 22 respectively. The collection of sample points from the total station 12 and inertial profiler 14 system are then reconciled by computing hardware located on the roving inertial profiler, as described in more detail below. With the reconciliation of the two sets of data points on the inertial profiler 14, the risk of errors or inaccuracies that can occur with alterative post processing methods is minimized. By merging the inertial profile and the survey data points, a highly detailed topology map of the surface 16 is generated, as described in more detail below.

Referring to FIG. 2A, a diagram of a high-resolution surface topology measurement system 30A using an inertial profiler and a RTK surveying instrument using GPS according to another embodiment of the present invention is shown. The RTK surveying instrument includes a conventional static base GPS unit 32 and a combination roving inertial profiler and GPS unit 34. As with conventional RTK surveying instruments, the static base GPS unit 32 measures its position relative to one or more GPS satellites 36, and generates a corrections factor signal, which compensates for atmospheric and other disturbances that may cause positional errors. Once the static base GPS unit 32 locks-in and accurately determines its position, it transmits the corrections factor signal to the combination roving inertial profiler and GPS unit 34. As the roving unit 34 moves across the surface 16, the onboard GPS unit samples and measures the X, Y and Z coordinate of multiple survey points on the surface 16. The correction factor signal from the static base GPS unit 32 is then applied to the measured X, Y and Z coordinate of each sample survey point, correcting for any inaccuracies due to atmospheric and other disturbances. At the same time, the inertial profiler on the roving unit 34 also generates highly accurate inertial profile data points. Since the survey points and the inertial profile points are generated at the same time and both on the roving unit 34, the two sets of data points are readily reconciled, minimizing the risk of errors or inaccuracies that can occur with post processing methods. During operation, the roving unit 34 traverses back and forth across the surface 16, as indicated by the dashed lines in the figure, collecting both the survey data points and the inertial profile data points. This information is subsequently processed in the manner described in detail below, generating a highly detailed topology map of the surface 16.

Figure 2B:
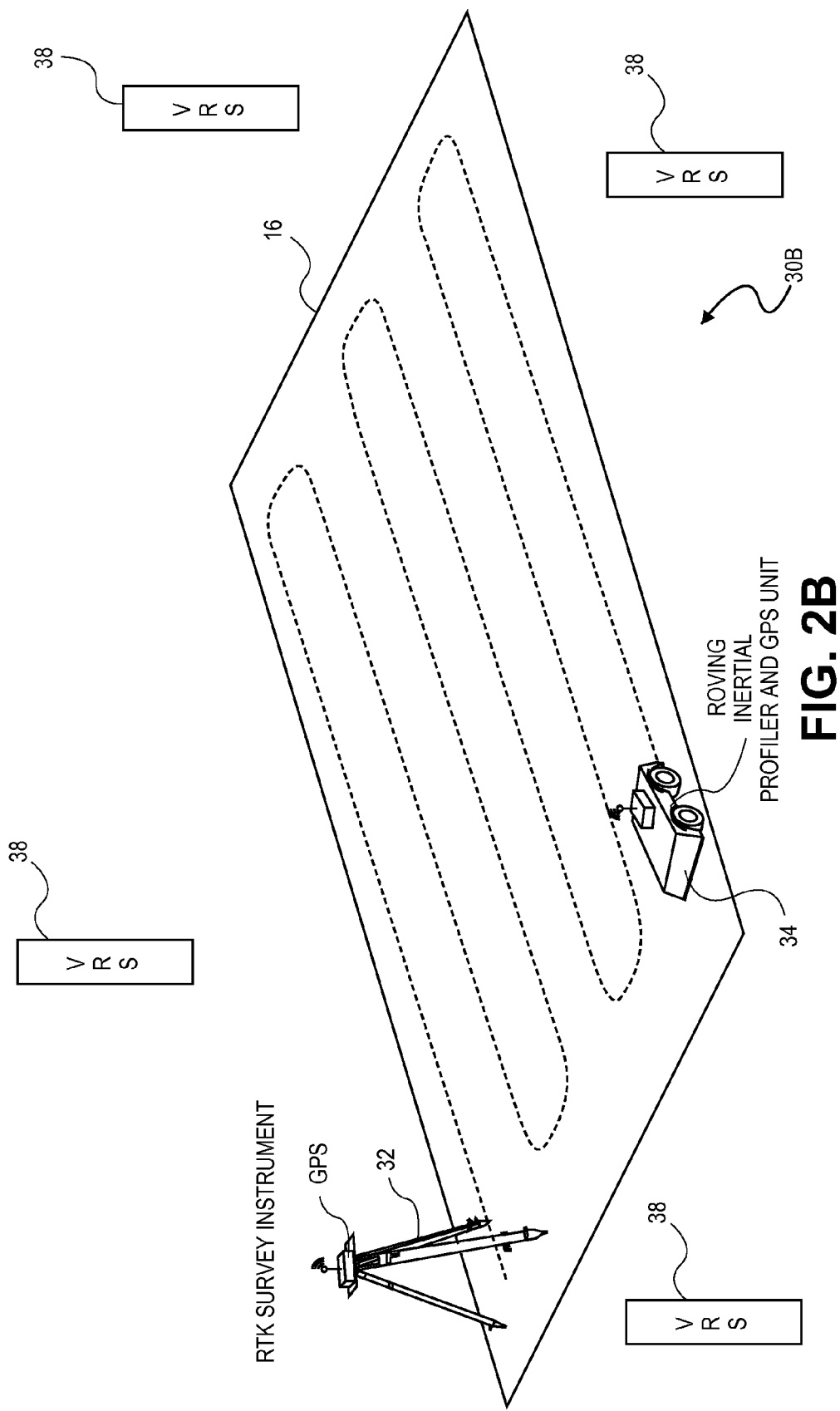
FIG. 2B is a diagram of a high-resolution surface topology measurement system using an inertial profiler and a RTK surveying instrument used in cooperation with a Virtual Reference System (VRS) according to another embodiment of the present invention

Referring to FIG. 2B, a diagram of a high-resolution surface topology measurement system 30B using an inertial profiler and a RTK surveying instrument 32 used in cooperation with a Virtual Reference System (VRS) according to another embodiment of the present invention is shown. This embodiment, is essentially the same as that described with regard to FIG. 2A, except the static base GPS unit 32 measures its position and generates the corrections factor signal relative to one or more networked Virtual Reference Stations (VRS) 38, as opposed to GPS satellites 36. Otherwise the operation of the two systems 30A and 30B are substantially identical, with the roving unit 34 collecting both inertial profile data points and multiple survey points, which are adjusted by the corrections factor signal. Again, the two sets of data points are reconciled and processed on the roving unit 34 to generate a highly detailed topology map of the surface 16, as described in more detail below. In one specific embodiment, the RTK surveying instrument 32 is a Carrier-Phase Enhancement GPS System (CPGPS) using a single VRS or a group of networked VSRs.

It should be noted that the inertial profiler used in the systems 10, 30A and 30B of FIGS. 1, 2A and 2B may differ in accordance with various embodiments. For example, these inertial profilers may include multiple laser and accelerometers sensors installed on the host vehicle. In one specific embodiment, the multiple lasers and sensors are arranged in a dual track system, which is capable of simultaneously generating inertial profile measurements along two longitudinal tracks on the surface to be measured. In embodiments where the roving profiler 34 has two inertial profiler tracks, the measured inertial profile data points of the first track may be matched with the survey points collected over the same longitudinal path. To enhance the accuracy of the inertial profiling data from the track 2 laser/accelerometer pair, an inclinometer or tilt-sensor, may be added to the roving host unit to detect deviations in any cross-slope or transverse movements of the vehicle. The cross-slope measurement from the tilt-sensor can be used to adjust the inertial profile points along the second track relative to the survey points taken along the first track when generating the surface topography map.

In yet another embodiment, the inertial profiling system may be configured with a line scan of lasers or a laser imaging system to collect inertial profile samples from a wider transverse area of the surface 16, as opposed to one or more narrow longitudinal runs as illustrated in FIGS. 1, 2A and 2B. In these embodiments, the increased number of collected data points from the transverse image may be useful to generate even more detailed surface topology maps than otherwise possible using just longitudinal profile data.

Figure 3:
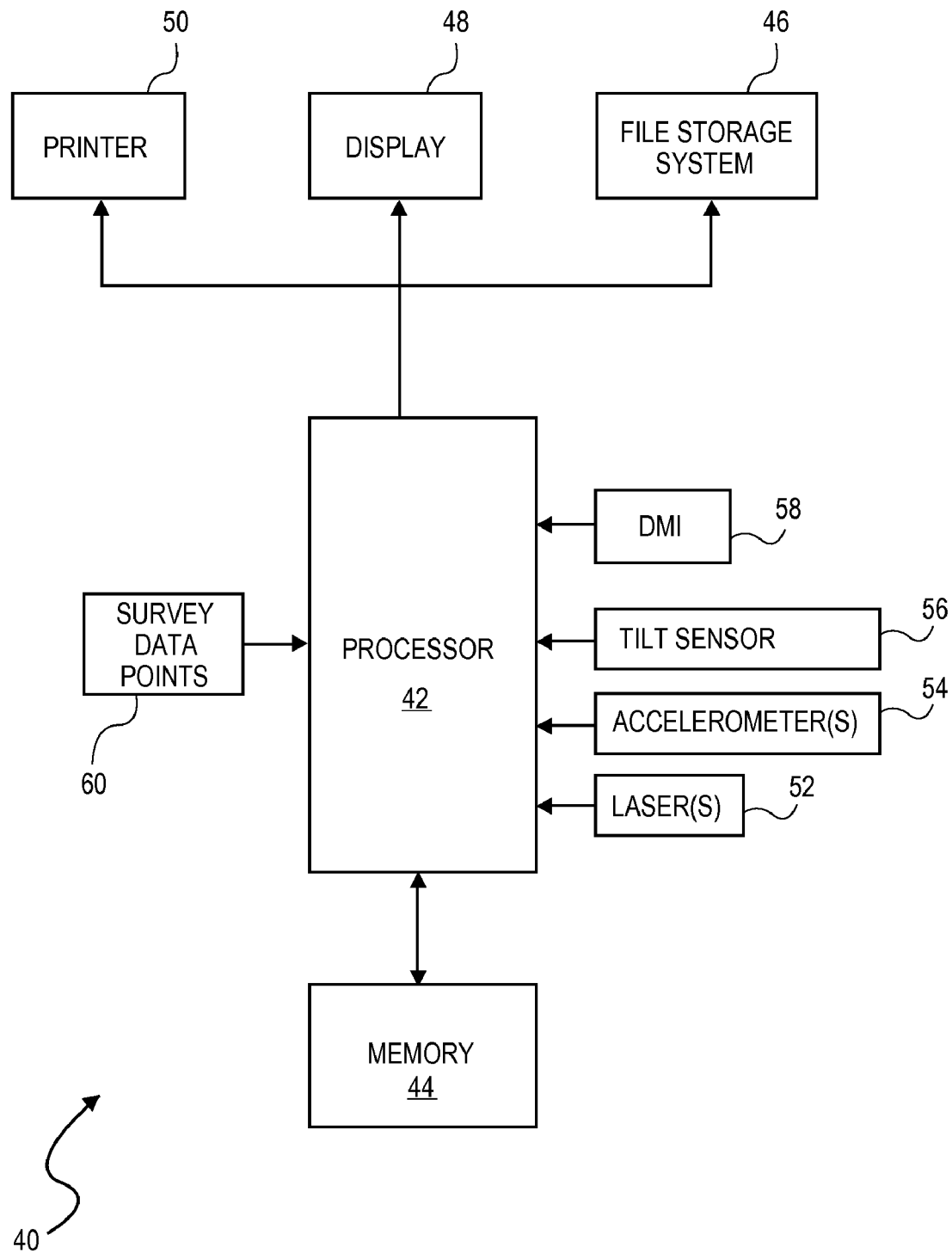
FIG. 3 is a diagram illustrating the computing hardware for generating high-resolution surface topology maps using data from both an inertial profiler and either a total stations or RTK surveying instrument used by the system of the present invention.

Referring to FIG. 3, a diagram illustrating computing hardware for generating high-resolution surface topology maps using inertial profile and survey data points is shown. The computing hardware 40 includes a processor 42, memory 44, a file storage system 46, and an optional display 48 and printer 50. The processor 42 is configured to receive inertial profile inputs from one or more lasers 52, one or more accelerometers 54, an optional tilt sensor 56, and a Distance Measuring Instrument (DMI) 58. The processor is also configured to receive survey data points 60 from a surveying instrument, either a total station 12 or RTK device 32.

During operation, the inertial profile sample points are computed by the processor from the inputs from the laser(s) 52, accelerometer(s) 54, the DMI 58 and the optional tilt sensor 56, which is typically used with two or more accelerometer/laser pairs located on opposing or different locations on the roving inertial profile unit. The processor 42 also reconciles the inertial profile data points with the incoming survey data points. Once the two data sets are reconciled, the processor generates the topology map of the measured surface. The memory 44 is a general-purpose memory used by the processor to temporarily store computational data. Once the topology map is generated, it is permanently stored in the file storage system 46, until it is deleted or transferred to another storage location. The display 48 and the printer 50 are provided for displaying and printing the topology maps. In various embodiments, the computing hardware 40 resides either on or remote from the roving inertial profiler. In yet another embodiment, the computing hardware may reside on a portable computer, such as a Panasonic Toughbook laptop computer, that can be installed on the roving inertial profiler during use and then later removed.

Figure 4:
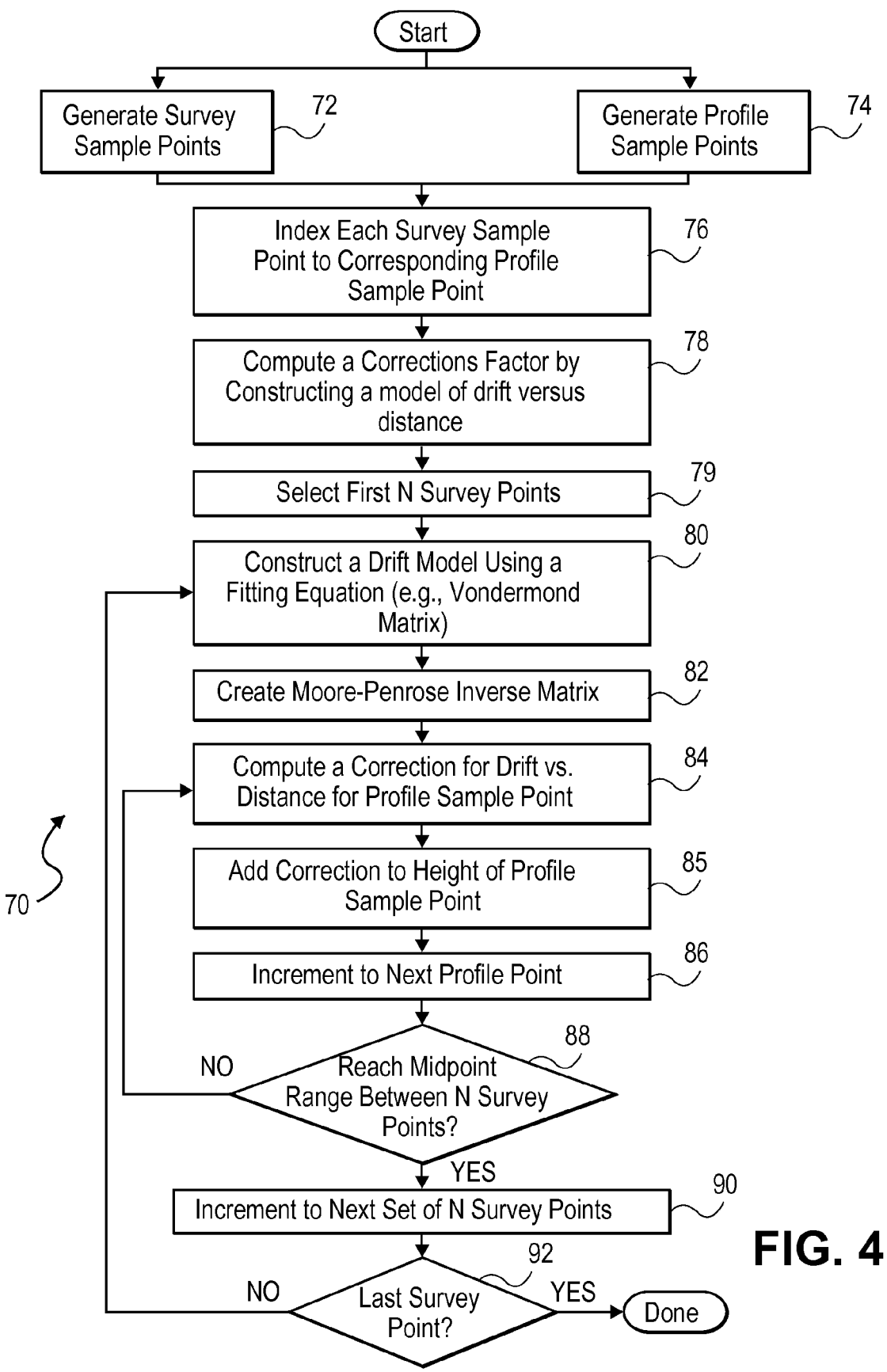
FIG. 4 is a flow diagram illustrating the algorithm implemented by the computing hardware to generate the high-resolution surface topology maps using inertial profiler and survey sample points according to the present invention.

Referring to FIG. 4, a flow diagram 70 illustrating the algorithm implemented by the computing hardware 40 to generate the high-resolution surface topology maps according to the present invention is illustrated. In the initial steps 72 and 74, the survey sample and the inertial profile sample points are respectively taken as the roving inertial profiler moves across the surface to be mapped. Since the survey points do not occur with the same sampling frequency as the inertial profile samples, each survey sample is indexed to the corresponding inertial profile sample (step 76).

In Table I provided below, the first few feet of the survey samples indexed relative to the inertial profile samples generated during an exemplary run is shown. In the first column, the survey data points are provided in sequential order. In the second column, the indexed inertial profile point that matches to the corresponding survey point is provided. In the third column, an optional status indicator sent provided by the GPS system to the RTK base-station. In this example, a status of "4", indicates a valid correction factor is being used. In total station embodiments where a correction factor signal is not used, the status indicator provided in column 3 is not needed. The numbers provided in the last three columns are the latitude, longitude and elevation of the survey sample respectively. In this example, the inertial profile points are sampled every inch.

TABLE I

| Survey Data # | Inertial Profile Sample # | GPS RTK Status | Latitude | Longitude | Elevation |
|---|---|---|---|---|---|
| 1 | 10 | 4 | 3912.211914 | 9635.817383 | 338.239990 |
| 2 | 43 | 4 | 3912.211426 | 9635.817383 | 338.250000 |
| 3 | 78 | 4 | 3912.211182 | 9635.817383 | 338.260010 |
| 4 | 114 | 4 | 3912.210693 | 9635.817383 | 338.269989 |
| 5 | 151 | 4 | 3912.210205 | 9635.817383 | 338.279999 |
| 6 | 191 | 4 | 3912.209473 | 9635.817383 | 338.290009 |

Thus the first survey point is indexed with the $10^{th}$ inertial profile sample or the $10^{th}$ inch. The second survey point is indexed with the $43^{rd}$ inertial profile sample point or the $43^{rd}$ inch and so forth for the remainder of the survey sample points. The inertial profile data on the other hand is sampled and saved as a sequence, with each sample being one inch (25 mm) apart.

In Table II below, the first 16 inertial profile height readings from the same collection of samples provided in Table I is listed.

TABLE II

| Inertial Profile Data | Height |
|---|---|
| Sample 1 | 0.044436538 |
| Sample 2 | 0.043727878 |
| Sample 3 | 0.042581068 |
| Sample 4 | 0.04263009 |
| Sample 5 | 0.04270883 |
| Sample 6 | 0.04337939 |
| Sample 7 | 0.043453558 |
| Sample 8 | 0.044520612 |
| Sample 9 | 0.044744132 |
| Sample 10 | 0.044912788 |
| Sample 11 | 0.044892214 |
| Sample 12 | 0.045008038 |
| Sample 13 | 0.045050964 |
| Sample 14 | 0.045050964 |
| Sample 15 | 0.044989242 |
| Sample 16 | 0.044791122 |

In the next step, a correction factor is computed between the latitude, longitude and height reading for each survey point relative to its indexed inertial profile sample (step 78). The correction factor is computed by constructing a model of the difference between the two measurements that is a function of distance. In other words, a model of the drift between the inertial and the survey reading is built as a function of distance. There are two parameters in this model that are arbitrary selected. The first parameter is the number of survey points used to build the model (N) (step 79) and the second parameter is the algebraic order of the model (M). For exemplary purposes, these parameters are set to N=4 and M=2 respectively.

The model of the inertial profiler's drift is created by taking the reading from the survey sample points in groups of N, and then computing the difference between the survey sample point elevations and the corresponding inertial profile elevation readings. For example the first survey point reading shows an elevation of 338.23999 meters as provided in the first row, last column of Table I, while the corresponding indexed profiler elevation at sample 10 of Table II is 0.044912788 meters. The difference between the indexed survey and inertial profile elevations (i.e., the drift numbers or values) for the first four survey samples are shown in Table III below.

TABLE III

| Survey Sample No. 1 | 338.239990 − 0.0449 = | 338.1950 |
| Survey Sample No. 2 | 338.250000 − 0.0431 = | 338.2069 |
| Survey Sample No. 3 | 338.260010 − 0.0450 = | 338.2150 |
| Survey Sample No. 4 | 338.269989 − 0.0457 = | 338.2242 |

For the second survey point, the height reading of the $43^{rd}$ sample profile point is subtracted from the elevation reading of the second survey sample. This subtraction process is continually repeated for all of the remaining survey points. As a result, a corrections factor is computed for each collected survey point (step 78). It should be noted that the height readings for the $43^{rd}$, $78^{th}$ and $114^{th}$ profile points are not listed in Table II for the sake of brevity, but are actual readings of the profile run used for this example.

In the next step 80, a drift model between the survey points and the corresponding or indexed inertial profile data points is constructed. In various embodiments, any type of equation fitting process could be employed to create an equation that relates drift to distance. A common way to develop such a model is to create a matrix that represents the various weights of the distances, such as the Vanermonde matrix as provided in Table IV. In this example, the first row corresponds to the first survey point, which is indexed to the 10th inertial profile reading. In the third, fourth and fifth columns, the second, first and zero power of the corresponding indexed profile reading are computed respectively. In other words, $(10^2=100)$, $(10^1=10)$ and $(10^0=1)$. The remaining three rows are created in a similar manner, using the second, first and zero power for the indexed profile samples 43, 78 and 114 corresponding to the next three survey samples 2, 3 and 4 respectively. Since we have chosen N=4. we created a matrix with four rows.

TABLE IV

| Survey Sample # | Index Profile # | Second Power | First Power | Zero Power |
|---|---|---|---|---|
| 1 | 10 | 100 | 10 | 1 |
| 2 | 43 | 1849 | 43 | 1 |
| 3 | 78 | 6084 | 78 | 1 |
| 4 | 114 | 12996 | 114 | 1 |

Continuing with the above example, the Moore-Penrose inverse of the above Vandermonde matrix is used in order to determine the equation for the drift model. (Step 82). The Moore-Penrose is a well-known operation that finds a least-square solution to an over-determined set of equations. By entering the values of the Vandermonde matrix of Table IV into a standard numerical computing environment (e.g., the study of algorithms for the problems of continuous mathematics; as distinguished from discrete mathematics) and programming language, such as MatLab maintained by MathWorks, using the standard "pinv( )" function, the inverse may be generated, provided below in Table V.

TABLE V

| 0.0002 | −0.0002 | −0.0002 | 0.0002 |
|---|---|---|---|
| −0.0348 | 0.0216 | 0.0299 | −0.0168 |
| 1.2686 | −0.0319 | −0.4351 | 0.1985 |

By multiplying the Moore-Penrose inverse, Table V as a matrix, with the drift values, Table III as a vector, the coefficients for an algebraic equation that computes drift as a function of distance are derived. This multiplication is done for this example and the results shown in Table VI provided below.

TABLE VI

| −0.0000210719341 |
|---|
| 0.0023845485353 |
| 336.4603140777334 |

An equation for drift as a function of the index of the inertial profile data can now be defined, since the index is directly related to the distance traveled. If we let (i) equal to the index of a given inertial profiler sample, then the drift for that point is equal to:

$$d = -0.0000210719341 * (i) * (i) + 0.0023845485353 * (i) + 336.4603140777334$$

A correction for drift versus distance is then computed (step 84) for the first inertial profile height reading, based on the correction model developed in the previous step and the corresponding index of that reading. The correction is then added (step 85) to the profile height reading to create a corrected reading. For example, the correction for the fourth profile sample, which has a height reading of 0.04263009 (taken from Table II) and an index of N=4 (i=4), is computed by the following equation:

$$0.04263009 + (-0.0000210719341) * 16 + 0.0023845485353 * 4 + + 336.4603140777334 * 1 = 336.5121452$$

The correction for the fourth inertial profile sample is therefore 336.5121452. The inertial survey point is then incremented (step 86).

In decision 88, the incremented inertial profile sample is compared to the midpoint range of the N survey samples of the model. Since in this example we are using four survey points (N=4), the midpoint range of inertial profile points is defined by the $43^{rd}$ and $78^{th}$ profile points, which correspond to the $2^{nd}$ and $3^{rd}$ survey points respectively. For the inertial profile points up through the end of the midpoint range (i.e., the $78^{th}$ profile point), the steps 84 and 85 are repeated, resulting the calculation of the drift versus distance and height correction or each inertial profile point.

When the end of the midpoint range is exceeded (decision 88), then a new model with a different set of four values of (N) is created. By eliminating the lowest value of N and incrementing by one (step 90), the new set of values for N is defined for the next pass. For example, if the initial values for N were survey points 1 through 4 for the first pass, then the next set of survey points is 2 through 5 for the second pass.

In the second pass, drift is computed (step 80), a new Vandermonde matrix is generated for survey points 2 through 5 as shown in Table VII below, and the Moore-Penrose inverse matrix performed (step 82). The calculation of the drift versus distance (step 84) and height correction (step 85) for each inertial survey point 79 through 114 as then performed respectively.

TABLE VII

| Survey Sample # | Index Profile # | Second Power | First Power | Zero Power |
|---|---|---|---|---|
| 2 | 43 | 1849 | 43 | 1 |
| 3 | 78 | 6084 | 78 | 1 |
| 4 | 114 | 12996 | 114 | 1 |
| 5 | 151 | 22801 | 151 | 1 |

Since $114^{th}$ profiler reading represents the end of the midpoint range for the second pass, the process increments to the next set of survey points (i.e., 3 through 6) in step 90, and the aforementioned process is repeated. With each pass, the steps 80 through 90 are repeated, over and over, until the last survey point is reached (step 92). Eventually when the last survey point is reached, the algorithm is complete, resulting in the high-resolution surface topology map. With each pass, there is a certain degree of overlap between the previous and next drift models.

It should be noted that for a typically surface profile, thousands upon thousands of inertial profile points and hundreds if not more survey points are typically generated. It is therefore not practical to list all inertial profile height samples or perform all the calculations provided in Table I through VII as provided above. Rather it should be understood that only partial tables have been constructed for the sake of illustration. In actual implementations, full Tables would be mathematically constructed in generating the highly detailed surface profile maps of the present invention.

Figure 5:
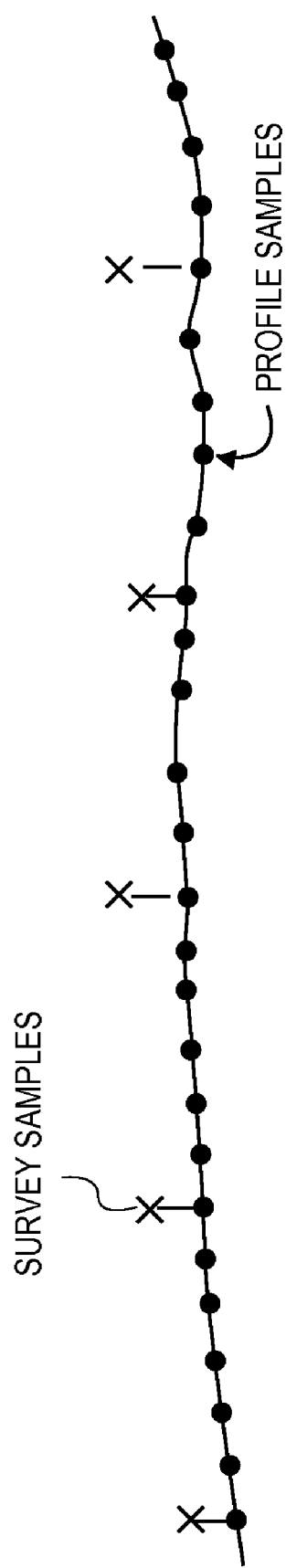
FIG. 5 is a plot illustrating unprocessed inertial profile sample points and survey instrument data samples collected during a single longitudinal run using the system of the present invention.
Figure 6:
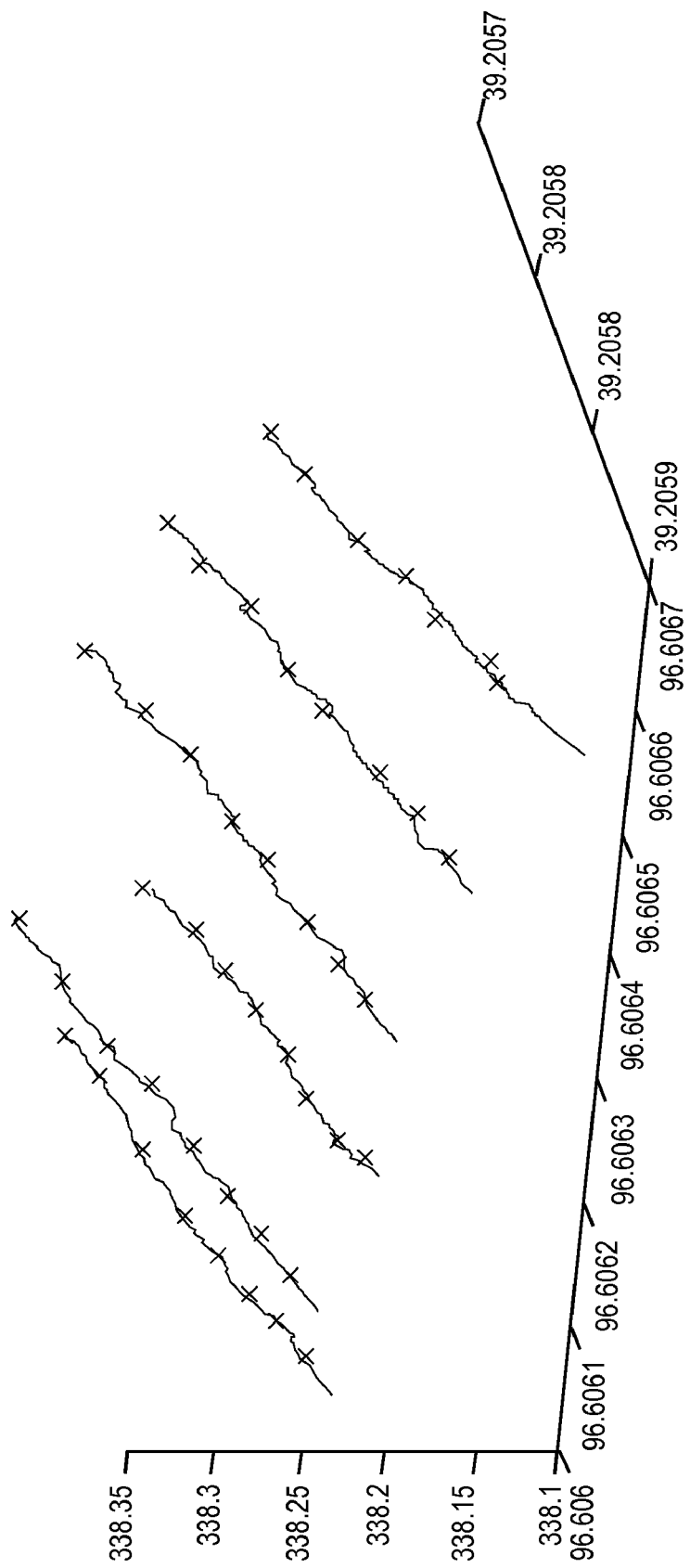
FIG. 6 is a plot illustrating inertial profile sample points of a multiple longitudinal runs adjusted to match the survey instrument data samples collected using the system of the present invention.

Referring to FIG. 5, a plot illustrating unprocessed inertial profile samples and survey instrument samples collected during a single longitudinal run using the system of the present invention is shown. In the diagram, the inertial profile samples are designated by solid dots "•", whereas the survey sample points are represented by the "X" markings. The inertial profile and survey sample points are "indexed" with respect to one another by distance, as described above with regard to step 76 of FIG. 4. In alternative embodiments, the inertial profile and survey sample points may also be indexed by time or both distance and time. In general, the survey samples X are more accurate than the profile samples from a global (i.e., a height or in the Z direction) perspective, whereas the inertial profile samples are more accurate on a point-to-point basis. It should be noted that in various embodiments, the survey sample points may be generated by either a total stations instrument 12 or RTK instrument 32. In addition, the inertial profile sample points may be either adjusted or not adjusted to compensate for cross slope deviations or traverse movements of the roving inertial profiler FIG. 6 is a plot illustrating inertial profile sample points of a multiple longitudinal runs adjusted to match the survey instrument data samples collected using the system of the present invention. The "X" markings show the original GPS samples along each of the longitudinal runs. The corrected inertial profile samples are shown by the solid lines running between the individual X marks after the inertial sample points are processed as described above with regard to FIG. 4.

Figure 7:
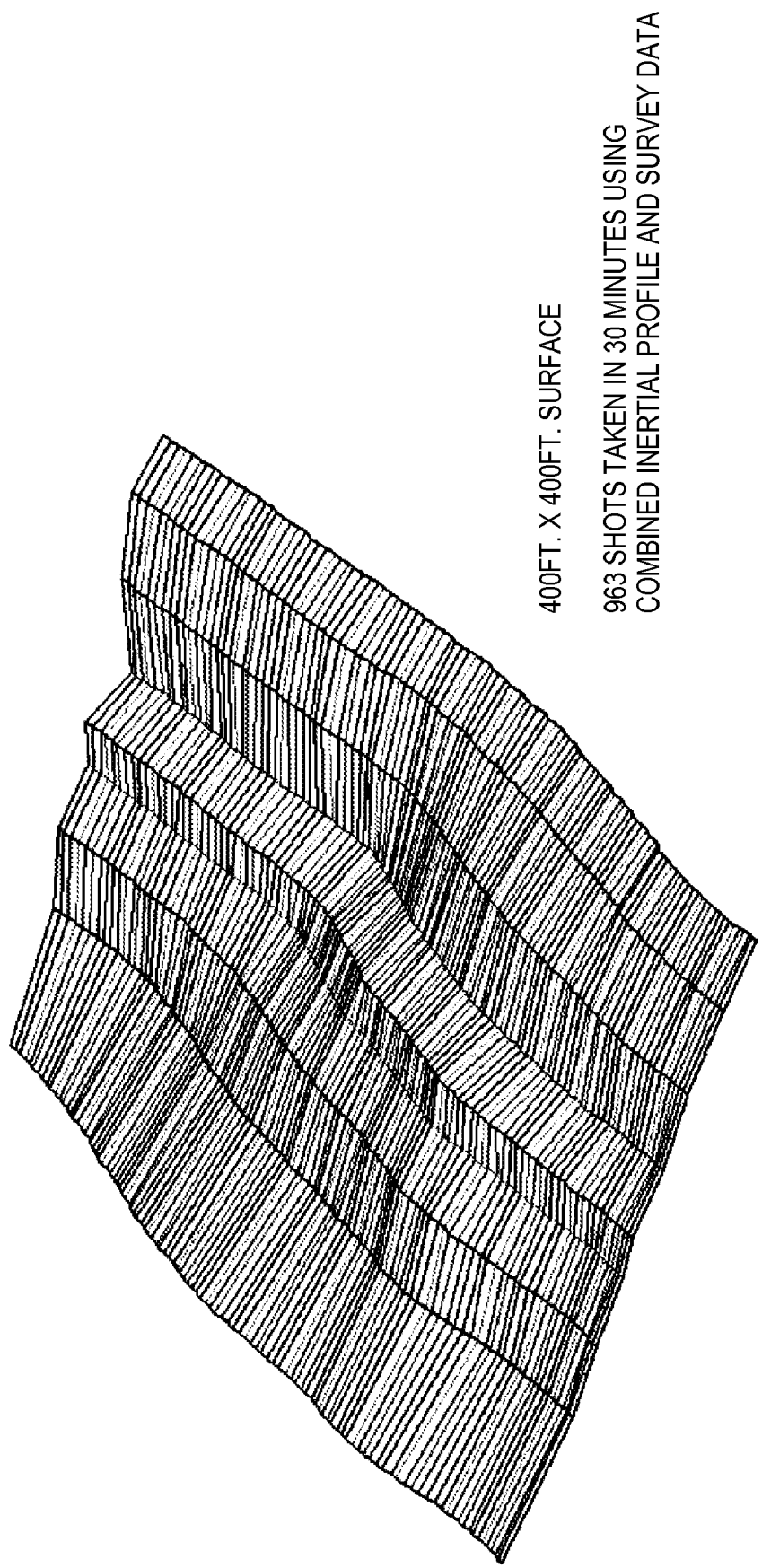
FIG. 7 is a high-resolution surface topology map created using the system of the present invention.

FIG. 7 is a high-resolution surface topology map created using the system of the present invention. The topography map is of an actual 400 feet×400 feet parking lot surface as measured by an inertial profiling system with an RTK system used in cooperation with either GPS or a VRS, as illustrated in FIG. 2A or 2B for example. The map was generated from 963 survey sample points or "shots" and the inertial profile samples in approximately thirty minutes. With current roving inertial profilers capable of traveling up to 70 miles per hour (112 kilometers per hour), a large number of shots of a surface to be mapped can be taken in a relatively short period of time.

Figure 8:
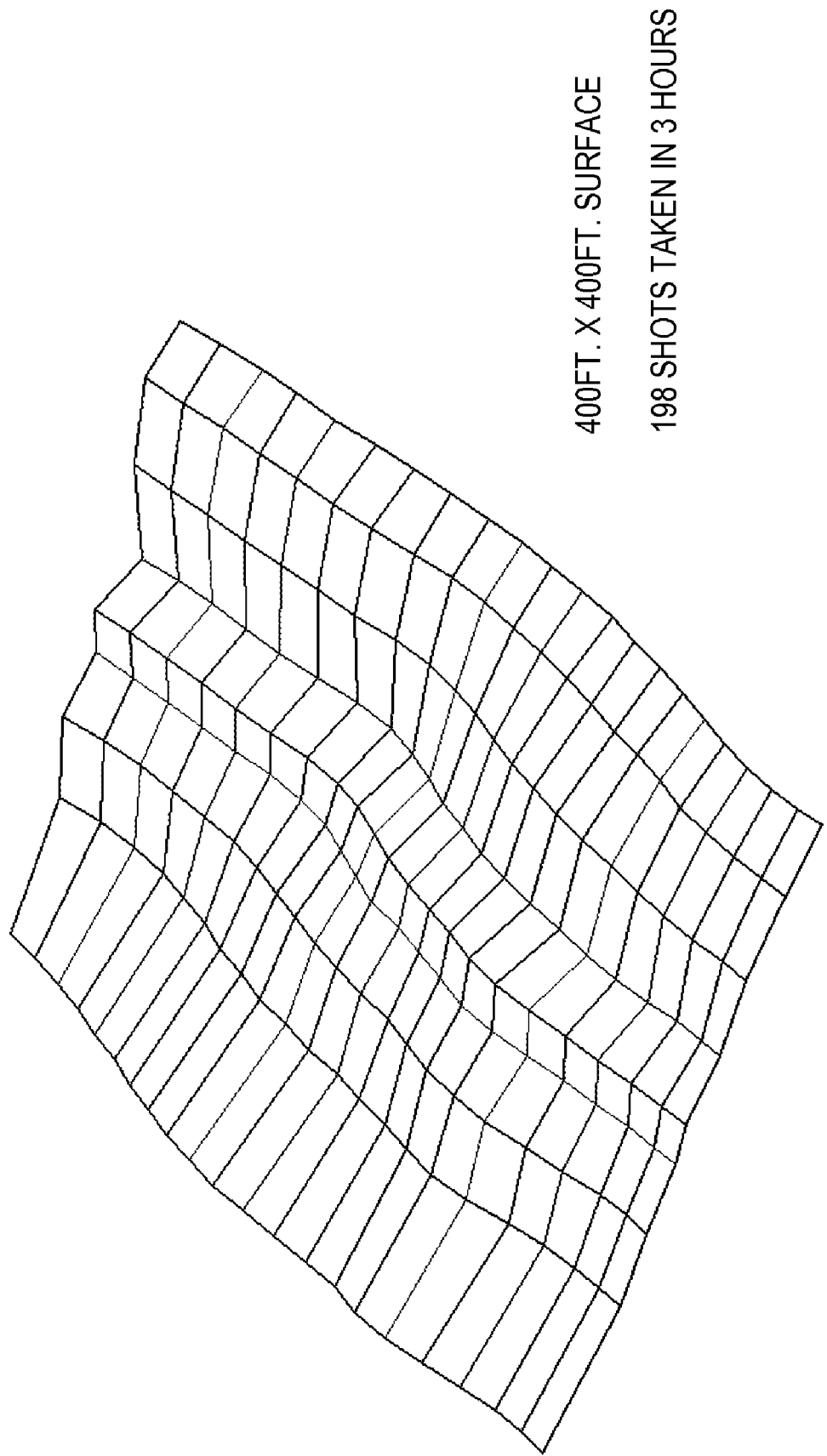
FIG. 8 is a surface topology created using only conventional surveying equipment.

FIG. 8 is a surface topology of the same 400 feet×400 feet parking lot created using only conventional surveying equipment. The topology map was created from 198 survey sample points or shots taken over a span of approximately 3 hours. As evident by comparing the two surface maps, the system of the present invention generates a denser, more accurate surface topology than is possible with conventional surveying instruments alone.

Figure 9:
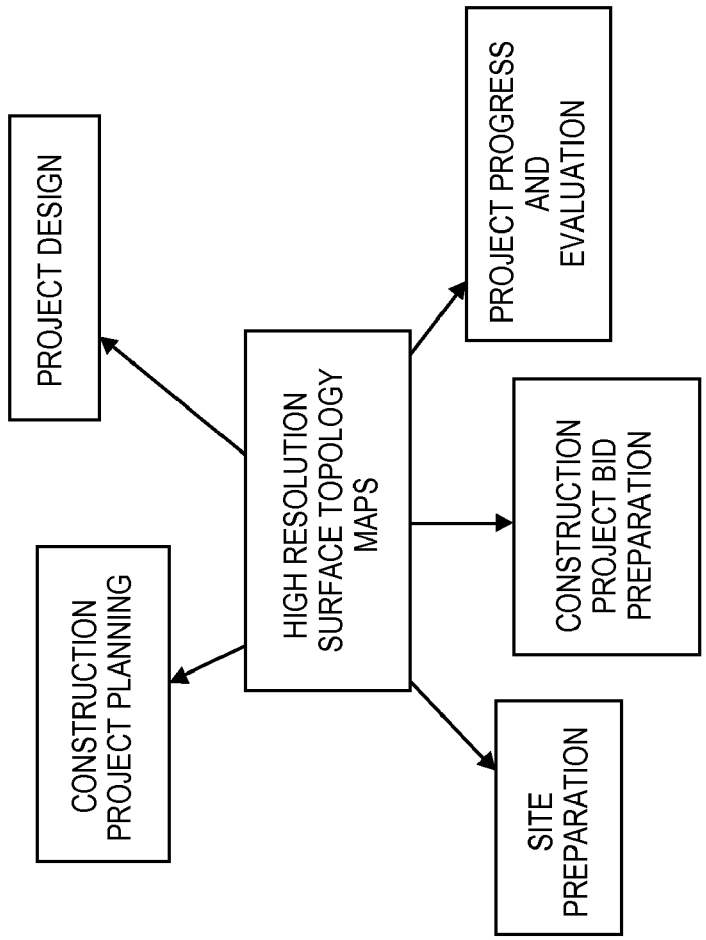
FIG. 9 is a diagram illustrating a number of uses or applications of the high resolution surface topology maps generated by the present invention

FIG. 9 illustrates a number of uses or applications the high-resolution surface topology maps of the present invention may be used for in the construction industry. As the systems 10, 30A and 30B enables a more thorough and accurate surface topography mapping in less time than traditional surveying techniques, it offers a number of opportunities in the construction industry. The higher resolution data is not only collected faster, but also has a higher data or sampling point density, and generates more accurate data files than conventional surveying instruments. The higher quality data results in significantly improved surface topology maps. The denser, more accurate maps may be used to improve the results of a wide range of construction project applications across several disciplines, including construction project bid preparation, estimating and proposal submission, project or site design, site preparation, construction project progress and evaluation, project design, and construction project planning.

Figure 10:
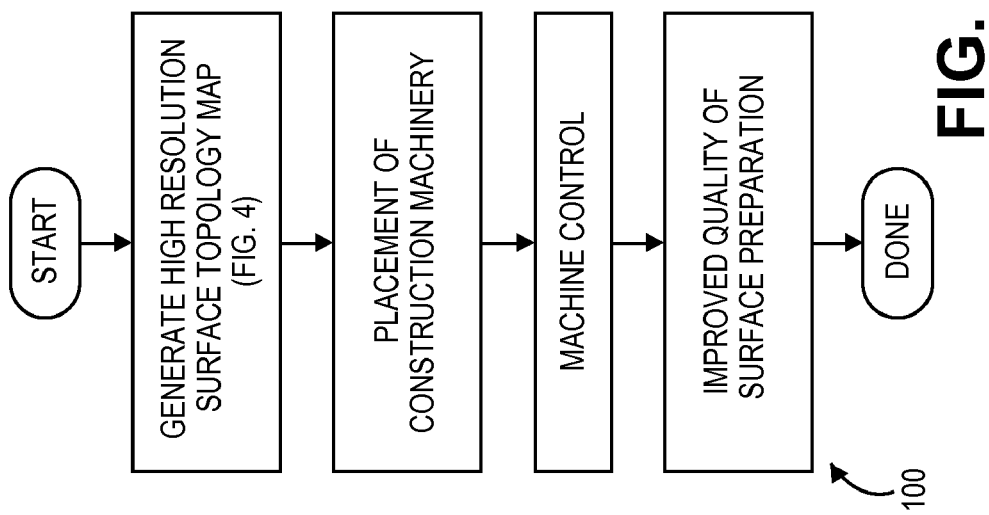
FIG. 10 is flow chart illustrating a sequence for using the high resolution surface topology maps.

FIG. 10 illustrates a flow chart illustrating a sequence for using the high-resolution surface topology maps to improve the quality of surface preparation according to the present invention. In the initial step 102, the high-resolution surface topology map of the construction site is generated. In the next step 104, construction machinery, such as milling machines, pavers and/or concrete grinders are placed at the construction site. In step 106, the high-resolution surface topology map is used in the finite control of movements of construction machinery, e.g., milling machines, pavers and/or concrete grinders. Specifically, the more detailed, accurate three-dimensional terrain maps enhance the ability to control construction machinery using the topography data for the surface in front of the equipment as opposed to conventional methods tied to the surface area on the side of, or underneath, the machinery. Consequently, the quality of the surface preparation is improved due to the use of the high-resolution surface topology map (step 108).

In yet other embodiments, the systems 10, 30A and 30B may be with a wide variety of other types of surface profiling systems, such as reference profiling devices or walking profilers. Most walking profiler devices are inclinometer-based systems that measure the surface profile as the instrument is moved along a test surface. Such instruments are commonly used for shorter surface data collections, such as airport runways or floor surfaces in commercial construction (factories, warehouses, etc.) These walking profilers typically use an inclinometer and optical encoders as the core sensors to measure surface profiles at a walking speed. The inclinometer and encoder based data collection allows measurement of absolute elevation changes, such that the device can generate a "true profile" with XYZ dimensional data content. However, the accuracy of the elevation component of the true profile can be impacted by several variables, including sensor drift, measurement error, vibration induced by coarse surface texture or an excessive operating speed on rough surfaces. To minimize any degradation in accuracy due to these variables, the integration of the profile data from the walking profiler with the data from survey instruments, as described above with regard to either system 10, 30A and 30B, may be used for the correction of measurement errors or other variables in the data collection. As such, walking profiler device can generate a denser, more accurate surface topography map, using essentially the same algorithm as described above with respect to FIG. 4, for merging the data from the walking profiler with a survey instrument. For more details on an example of a walking profiler see for example model number CS8800 designed and sold by Surface Systems and Instruments, LLC, Mill Valley, Calif., assignee of the present application.

Although one or more different embodiments of the method and systems 10, 30A and 30B are described above, it will be appreciated by one of skill in the art that multiple other embodiments be used and practice the techniques of the present invention described herein. It should be understood by those skilled in the art that a variety of changes in the form and details of the disclosed embodiments may be made without departing from the spirit or scope of the invention. It is therefore intended that the invention be interpreted to include all variations and equivalents that fall within the true spirit and scope of the invention.

What is claimed is:

1. An apparatus configured to generate a surface topology map of a surface, comprising:
    a computing system operative with a profiling apparatus, the computing system comprising one or more inputs configured to receive:
    a plurality of profile sample points received from the profiling apparatus generated as the profiling apparatus roves across the surface to be mapped;
    a plurality of survey sample points of the surface; and
    a processor configured to:
    correlate the profile sample points with the survey sample points in the Z direction;
    merge the plurality of survey sample points and the correlated profile sample points; and
    generate the surface topology map of the surface from the merged plurality of survey sample points and the correlated profile sample points.

2. The apparatus of claim 1, wherein each of the plurality of survey sample points defines a latitude, longitude, and elevation reading of a sampled location on the surface.

3. The apparatus of claim 1, wherein each of the plurality of profile sample points defines a height reading of a sampled location on the surface.

4. The apparatus of claim 1, wherein the processor is further configured to index the plurality of survey sample points and the plurality of profile sample points respectively.

5. The apparatus of claim 4, wherein the processor indexes the plurality of survey sample points and the plurality of profile sample points by one of the following:
    (i) by time;
    (ii) by location on the surface; or
    (iii) both (i) and (ii).

6. The apparatus of claim 1, wherein the computing system is further configured to receive profile information, the profile information including one or more of the following:

a vertical displacement signal indicative of the vertical displacement from a fixed point on the profiling apparatus relative to the surface;

a vertical acceleration signal indicative of the vertical acceleration of the profiling apparatus as the apparatus roves over the surface; and a distance measurement signal indicative of the longitudinal movement of the profiling apparatus when roving over the surface.

7. The apparatus of claim 1, wherein the one or more inputs is further configured to receive latitude, longitude, and elevation readings for the plurality of survey sample points from a survey instrument used in cooperation with the profiling apparatus.

8. The apparatus of claim 1, wherein the profiling apparatus further comprises a prism that is configured to be used in cooperation with a total stations type survey instrument.

9. The apparatus of claim 1, wherein the one or more inputs is further configured to receive a latitude, longitude, and elevation reading of the surface for each of the survey sample points collected as the profiling apparatus roves over the surface.

10. The apparatus of claim 9, wherein the processor is further configured to receive a correction factor signal as the plurality of survey sample points are received, the correction factor signal configured to compensate in the Z direction the elevation readings of the plurality of survey sample points respectively.

11. The apparatus of claim 10, wherein the correction factor signal is generated by a survey instrument used in cooperation with the profiling apparatus, the correction factor signal being derived from either a Virtual Reference Station (VRS) or GPS system.

12. The apparatus of claim 11, wherein the survey instrument used in cooperation with the profiling apparatus comprises one of the following:
(i) a total stations; or
(ii) a Real Time Kinematic (RTK) surveying device.

13. The apparatus of claim 1, wherein the processor is further configured to reconcile the plurality of profile sample points and the plurality of survey sample points respectively.

14. The apparatus of claim 1, wherein the profiling apparatus further comprises a first longitudinal track, the plurality of the sample points derived along the first longitudinal track as the profiling apparatus roves across the surface.

15. The apparatus of claim 1, wherein the profiling apparatus further comprises:
a first longitudinal track and a second longitudinal track, the plurality of the sample points derived along both the first longitudinal track and the second longitudinal track; and
a tilt sensor to compensate for cross-slope differences between the first longitudinal track and a second longitudinal track.

16. The apparatus of claim 1, wherein the profiling apparatus is an inertial profiling device configured to be mounted onto a motorized vehicle that may be driven over the surface.

17. The apparatus of claim 1, wherein the profiling apparatus is an inclinometer based walking profiling device.

18. The apparatus of claim 1, wherein the processor merges the plurality of survey sample points and the correlated profile sample points by filling in the correlated profile sample points between the survey sample points respectively.

19. The apparatus of claim 1, wherein the computing system is configured to receive the plurality of profile sample points at a first frequency and is configured to receive the plurality of survey sample points at a second frequency, wherein the first frequency is greater than the second frequency.

20. The apparatus of claim 1, wherein the processor is further configured to correlate the profile sample points with the survey sample points in the Z direction by indexing the plurality of survey sample points to a corresponding one of the plurality of profile sample points respectively.

21. The apparatus of claim 20, wherein the processor is further configured to compute a correction factor for each of the plurality of survey sample points respectively.

22. The apparatus of claim 21, wherein the processor is further configured to compute the correction factor by generating a drift model between each of the plurality of survey sample points relative to the corresponding one of the plurality of profile sample points respectively.

23. The apparatus of claim 22, wherein the processor is further configured to generate the drift model by selecting a set of (N) survey sample points to build the model.

24. The apparatus of claim 23, wherein (N) is initially set to the first 4 survey sample points.

25. The apparatus of claim 22, wherein generating the drift model further comprises selecting an algebraic order of (M), where (M) is set to 2.

26. The apparatus of claim 22, wherein the processor computes the drift model by:
(a) computing the elevation difference between the (N) survey sample points and the corresponding indexed profile sample points respectively; and
(b) computing the drift model between the (N) sample points and the corresponding indexed profile sample points by using a fitting equation that relates drift to distance.

27. The apparatus of claim 26, wherein the processor uses the fitting equation that relates drift to distance by:
(c) creating a Vandermonde matrix for the (N) survey sample points, the Vandermonde matrix including the second power, the first power and the zero power of the corresponding indexed profile sample points of the (N) survey sample points respectively; and
(d) performing a Moore-Penrose inverse of the Vandermode matrix;
(e) multiplying the Moore-Penrose inverse as a Matrix with the computed differences between the (N) survey sample points and the corresponding indexed profile sample points as a vector; and
(f) defining from the results of the multiplication of (e) an equation for drift for the indexed profile sample points corresponding to the indexed (N) survey sample points respectively.

28. The apparatus of claim 27, wherein the processor further:
(g) computes a correction for drift versus distance for a first profile sample point corresponding to the (N) survey sample points from the equation defined in (f); and
(h) adds the computed correction of (g) to the height reading of the first profile sample point.

29. The apparatus of claim 28, wherein the processor further:
(i) increments the first profile sample point to the next profile sample point;
(j) repeats (g) and (h) for the incremented profile sample point; and
(k) repeats (j) for each incremented profile survey point until the incremented profile sample points exceeds a midpoint range of the profile sample points corresponding to the (N) survey sample points respectively.

30. The apparatus of claim 29, wherein the processor, after the midpoint range of the profile sample points is exceeded, further:
(1) selects a new set of (N) survey sample points by removing the lowest indexed survey sample point from the previous (N) survey points and including the next indexed survey sample point to the new set of (N) survey sample points; and
(m) repeats (a) through (k) for the profile sample points corresponding to the new set of (N) survey sample points respectively.

31. The apparatus of claim 30, wherein the processor further:
(n) repeats (1) and (m) until the last survey sample point; and
(o) generates the surface topology map of the surface from the plurality of survey sample points and the computed correction of the height reading of the correlated profile sample points after performing (n).

32. The apparatus of claim 22, wherein the drift model is generated between each of the plurality of survey sample points relative to the corresponding one of the plurality of profile sample points as a function of distance respectively.

33. The apparatus of claim 1, wherein the computing system includes one or more of the following:
(i) a memory;
(ii) a file storage system;
(iii) a printer; and
(iv) a display.

34. The apparatus of claim 1, wherein the computing system is implemented in a computer mounted onto the profiling device.

35. The apparatus of claim 1, wherein the Z direction is a height reading.

* * * * *